United States Patent
Schryver

(10) Patent No.: US 9,264,399 B1
(45) Date of Patent: Feb. 16, 2016

(54) LOCK-FREE UPDATES TO A DOMAIN NAME BLACKLIST

(71) Applicant: Farsight Security, Inc., San Mateo, CA (US)

(72) Inventor: Vernon Schryver, Boulder, CO (US)

(73) Assignee: Farsight Security, Inc., San Mateo, CA (US)

( * ) Notice: Subject to any disclaimer, the term of this patent is extended or adjusted under 35 U.S.C. 154(b) by 0 days.

(21) Appl. No.: 14/829,103

(22) Filed: Aug. 18, 2015

(51) Int. Cl.
*G06F 15/16* (2006.01)
*H04L 29/12* (2006.01)

(52) U.S. Cl.
CPC ........ *H04L 61/3025* (2013.01); *H04L 61/1511* (2013.01); *H04L 61/6009* (2013.01)

(58) Field of Classification Search
CPC ............ H04L 61/3025; H04L 61/1511; H04L 61/1552; H04L 61/6009
USPC .......................................... 709/217, 219, 245
See application file for complete search history.

(56) References Cited

U.S. PATENT DOCUMENTS

| 2012/0017259 | A1* | 1/2012 | MacCarthaigh | H04L 29/12066 726/1 |
| 2012/0179801 | A1* | 7/2012 | Luna | H04L 61/6009 709/223 |
| 2015/0058488 | A1* | 2/2015 | Backholm | H04L 61/1511 709/226 |
| 2015/0215267 | A1* | 7/2015 | Kagan | H04L 61/1511 709/245 |

* cited by examiner

*Primary Examiner* — Viet Vu
(74) *Attorney, Agent, or Firm* — Sterne, Kessler, Goldstein & Fox P.L.L.C.

(57) ABSTRACT

A computer-implemented method updates a domain name system blacklist in a lock-free manner is disclosed. In the method, an entry of the domain name blacklist is read at a DNS resolver in a plurality of DNS resolvers. The entry specifies a policy for the DNS resolver to execute when the DNS resolver receives a request to resolve a domain name. Before the reading is complete, an updated entry of the domain name blacklist is received, a new record to the domain name blacklist is added, and the entry being read is placed into a garbage pool having a current version number. Independently from the reading of the entry, the current version number is incremented and a new garbage pool is created for the incremented version number. When the reading is complete, the current version number is assigned to the DNS resolver.

21 Claims, 11 Drawing Sheets

LOCK-FREE UPDATES TO A DOMAIN NAME BLACKLIST

BACKGROUND

1. Field

This field is generally related to network security, and more specifically updating Domain Name System (DNS) blacklist records.

2. Related Art

A communication network may, for example, allow data to be transferred between two geographically remote locations. To transmit data over a network, the data is often divided into pieces, known as packets or blocks. Each packet or block may have a destination network address, such as an IP address, that indicates a destination of the packet and tells forwarding devices how the packet should be routed. These addresses are often numerical, difficult to remember, and may frequently change.

To identify a destination, domain names are frequently used. Domain names identify a destination host, or server, and may map to a corresponding network address. For example, the domain name www.example.com may map to the network address 93.184.216.119. To map domain names to network addresses, a domain name system (DNS) may be used. DNS may divide the namespace into a hierarchy with different organizations controlling different portions of the hierarchy. In different portions of the hierarchy, different name servers may store resource records that map domain names to network addresses.

To look up a network address from a domain name, DNS may use resolvers that execute a sequence of queries to different name servers. For example, the sequence of queries to resolve www.example.com may start at the root name server, which indicates the address of the name server for .com. Then, the DNS resolver may query the name server for .com for the address of the name server for example.com. Then, the DNS resolver may query the name server for example.com for the address of www.example.com. In practice, so that a resolver does not need to go through the entire sequence for each request, the resolver may cache the addresses of the various name servers. Also in practice, the full query name may be sent to each server, in order to discover an answer if present, or a subdelegation, or a name-not-present condition, opportunistically.

Many new domains are registered every day. But not all domains are registered for legitimate purposes. Some domains are registered for malicious purposes. One malicious purpose is to bring down a network service. Attacks for this purpose may be called denial of service attacks. One example of a denial of service attack is Transport Control Protocol (TCP) SYN flood abuse.

Other network abuses may not be trying to bring down a service, but may instead be making network requests, including application-level requests, for other improper purposes. In these abuses, an automated system may be making application requests that, for example, set up fake user accounts and try to entice a user to devolve confidential information, such as her password, credit card information, or Social Security number, or run other scams. Domains may be registered to support these abuses as well as other types of network abuses including malware, phishing, or spam.

To protect against network abuse, network administrators can configure DNS resolvers to block or redirect lookups to domain names believed to be malicious. For example, Domain Name Service Response Policy Zones (DNS RPZ) provide a mechanism to block or redirect specified domain names lookups.

Services are available that provide updates to RPZ databases. For example, services may provide domain names that are suspected of being malicious. Using the services, the databases may be continuously updated, perhaps once a minute or even once a second. During the updates, the RPZ database, or portion of the database, may be locked, blocking concurrent read requests. If multiple DNS resolvers are trying to access the RPZ database, they all may be blocked. Blocking read requests can slow a DNS resolver's response time when it receives requests to resolve a domain name into an IP address.

Systems and methods are needed to more efficiently update a response policy zone database.

BRIEF SUMMARY

In an embodiment, a computer-implemented method updates a domain name system blacklist in a lock-free manner. In the method, an entry of the domain name blacklist is read at a DNS resolver in a plurality of DNS resolvers. The entry specifies a policy for the DNS resolver to execute when the DNS resolver receives a request to resolve a domain name. Before the reading is complete, an updated entry of the domain name blacklist is received, a new record to the domain name blacklist is added, and the entry being read is placed into a garbage pool having a current version number. Independently from the reading of the entry, the current version number is incremented and a new garbage pool is created for the incremented version number. When the reading is complete, the current version number is assigned to the DNS resolver.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Embodiments enable updates to a response policy zone database without acquiring a lock. They enable data to be written to an RPZ database concurrent with RPZ resolvers reading from the RPZ database. To achieve concurrent reading and writing, when the RPZ information is updated, entries in the RPZ database are not immediately overwritten or deleted. Instead, they are designated as garbage. That designation remains until all reads are complete. When all reads are complete, the garbage is deleted. In this way, embodiments enable lock free updates to a response policy zone database.

While examples are provided for DNS RPZ data for illustrative purposes, persons of skill in the art would recognize that the lock free updating technique described herein would apply to other types of data as well. An example environment in which the lock-free updating of the present disclosure may be applied is illustrated in FIG. 1.

Figure 1:
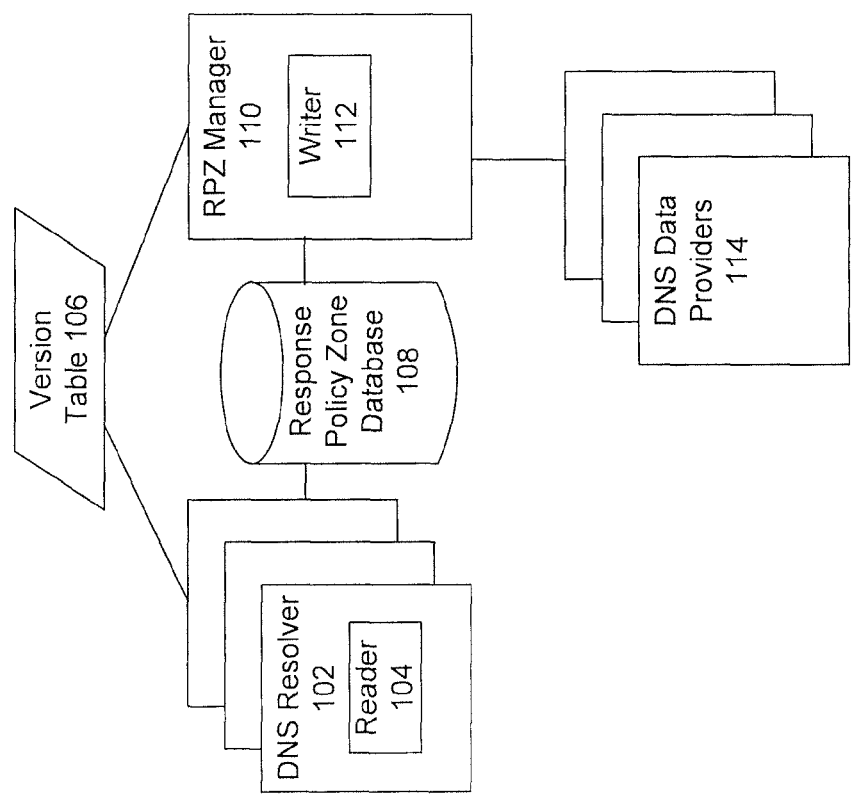
FIG. 1 illustrates a system for updating a domain name system blacklist in a lock-free manner according to an embodiment.

FIG. 1 illustrates a system 100 for updating a domain name system blacklist in a lock-free manner according to an embodiment. System 100 includes a plurality of DNS resolvers 102, a response policy zone database 108, an RPZ manager 110, a version table 106, and a plurality of DNS data providers 114.

As described above, DNS resolvers 102 may receive requests to resolve a network address (e.g., an IP address) from a domain name. The requests may come from other computers on a network (not shown). To resolve a domain name, DNS resolvers 102 may send recursive requests to DNS servers (also not shown). Each of the DNS resolvers 102 may, for example, operate on a separate thread of execution.

Before resolving the domain name, DNS resolvers 102 may check response policy zone (RPZ) database 108 to determine whether to resolve the domain name. To read from RPZ database 108, each DNS resolver 102 includes a reader 104 that reads data from RPZ database 108.

If RPZ database 108 indicates not to resolve the domain name, the domain name may be blacklisted. In that case, DNS resolvers 102 may instead return a network address of a page indicating that the requested domain name has been blocked.

Each of the plurality of DNS resolvers 102 may have a corresponding entry in version table 106. The entry in version table 106 may represent a current version of data in RPZ database 108 that the corresponding DNS resolver 102 is operating against. When a DNS resolver 102 completes a read from RPZ database 108, but before the DNS resolver 102 begins another read from RPZ database 108, the DNS resolver 102 may be updated to the current version. In other words, the DNS resolver 102's corresponding entry in version table 106 may be set to the most up-to-date version number.

RPZ manager 110 may be responsible for updating RPZ database 108. RPZ manager 110 may, for example, receive updated RPZ data from one or more DNS data providers 114. DNS data providers 114 may employ sensors or algorithms to detect potentially malicious domains. In one example, when a domain is newly observed, it may be presumed malicious for a period of time. Example DNS data providers 114 may be Farsight Security Inc. of San Mateo, Calif., which may detect newly observed domains, or The Spamhaus Project Ltd. of Geneva, Switzerland, which may compile domains of known spammers.

To update RPZ database 108, RPZ manager 110 may use a writer 112. When RPZ manager 110 receives an update to an entry in RPZ database 108, writer 112 may not overwrite the entry. Instead, writer 112 may designate the entry as being out of date, e.g., by placing it into a garbage pool, and write the new data to a new location. The garbage pool may be assigned a current version number.

Periodically, RPZ manager 110 may update the version number, creating a new garbage pool to put outdated data in. Also, periodically, RPZ manager 110 may review version table 110 to determine the oldest version of RPZ data that the plurality of DNS resolvers 102 is currently using. Then, upon determining the oldest version that is currently being used by a DNS resolver 102, RPZ manager 110 may delete all garbage pools having older versions. In this way, RPZ manager 110 may delete data once it is no longer being used.

The following discussion is divided into sections describing the operation and components of system 100 is described in greater detail with illustrative examples. First, the following discussion describes how a DNS resolver 102 initializes its use of RPZ data with respect to FIGS. 2 and 3. Second, the discussion describes how RPZ data is updated with respect to FIGS. 4-6. Third, the discussion describes how RPZ data is queried and deleted with respect to FIGS. 7-10. Finally, the discussion enumerates and describes different components of system 100 in greater detail.

Initializing Use of RPZ Data

Figure 2:
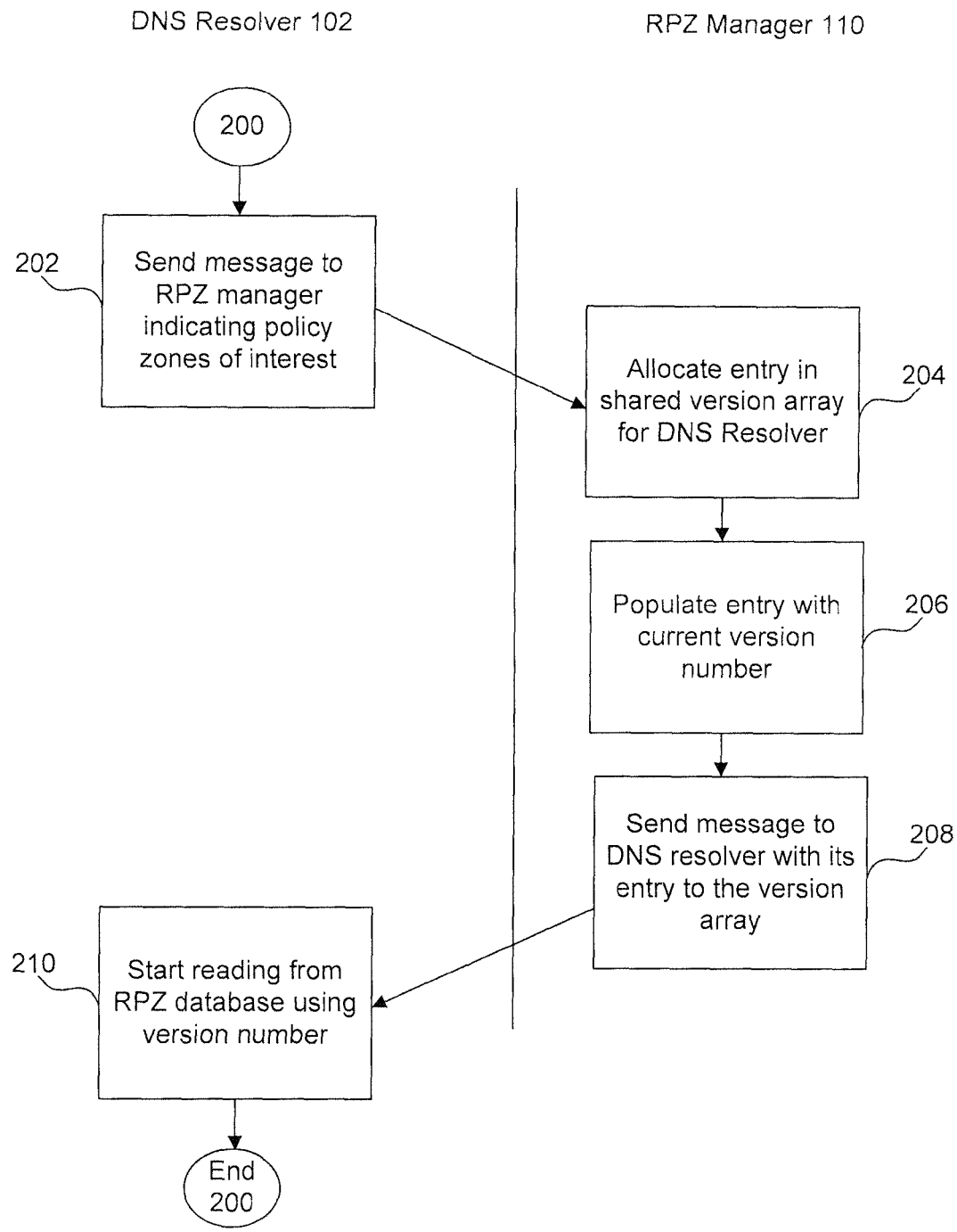
FIG. 2 illustrates a method for a DNS resolver to start reading from the domain name system blacklist, which may be used in operation of the system in FIG. 1.

FIG. 2 illustrates a method 200 for a DNS resolver, such as DNS resolver 102 in FIG. 1, to start reading from the domain name system blacklist, which may be used in operation of the system in FIG. 1.

Method 200 begins at a step 202 when DNS resolver 102 sends a message to an RPZ manager, such as RPZ manager 110 in FIG. 1. The message may indicate, for example, RPZ information that a DNS administrator would like to subscribe to. To specify the RPZ information, the message may specify the DNS data providers 114 that provide the information.

When RPZ manager 110 receives the information, it registers DNS resolver 102 that is to receive the requested RPZ information. To register DNS resolver 102, RPZ manager 110 allocates a location for DNS resolver 102 in a shared version array, such as version table 106, at step 204. The location in the array may be defined by an index or slot number.

At step 206, RPZ manager 110 populates the location in the array for RPZ manager 110. Because DNS resolver 102 has yet to begin reading the RPZ information, when it begins reading, it will be reading the most current RPZ information. For that reason, RPZ manager 110 may populate DNS resolver 102's location with the most up-to-date version number. An example version table is illustrated in FIG. 3

Figure 3:
FIG. 3 is a diagram illustrating an example version table that may be returned to the system in FIG. 1 when a DNS resolver is to start reading from the domain name system blacklist.

FIG. 3 is a diagram illustrating an example version table 300. Version table 300 includes slot numbers 0 . . . N, with each slot number specifying a location in the table. In this example, at step 204, RPZ manager 110 may allocate slot number 1 to DNS resolver 102. And, at step 206, RPZ manager 110 may populate slot number 1 with the most current version number, in this case the number 5.

Returning to FIG. 2, at step 208, RPZ manager 110 sends a message to DNS resolver 102 with DNS resolver 102's location in the shared version array. At step 210, DNS resolver 102 uses this location information to start reading from an RPZ database, such as RPZ database 108 in FIG. 1.

As discussed in greater detail below, DNS resolver 102 can use the shared location to indicate to RPZ manager 110 what version of data it is currently reading. In particular, RPZ manager 110 is continuously receiving updated data. To update its RPZ database 108, RPZ manager 110 may store new records corresponding to the updated data, but may not immediately delete or overwrite older versions of that data, as described below with respect to FIGS. 4-6. RPZ manager 110 may not immediately delete or override older versions because DNS resolvers 102 may concurrently be reading from those older versions, as described below with respect to FIG. 7. Instead of immediately deleting or overwriting older versions, RPZ manager 110 may monitor the shared version array to determine what version of data each DNS resolver 102 is currently reading. Once all the DNS resolvers 102 have completed reads of an older version, RPZ manager 110 may delete the older version as described below with respect to FIGS. 8-10.

Updating RPZ Data

Figure 4:
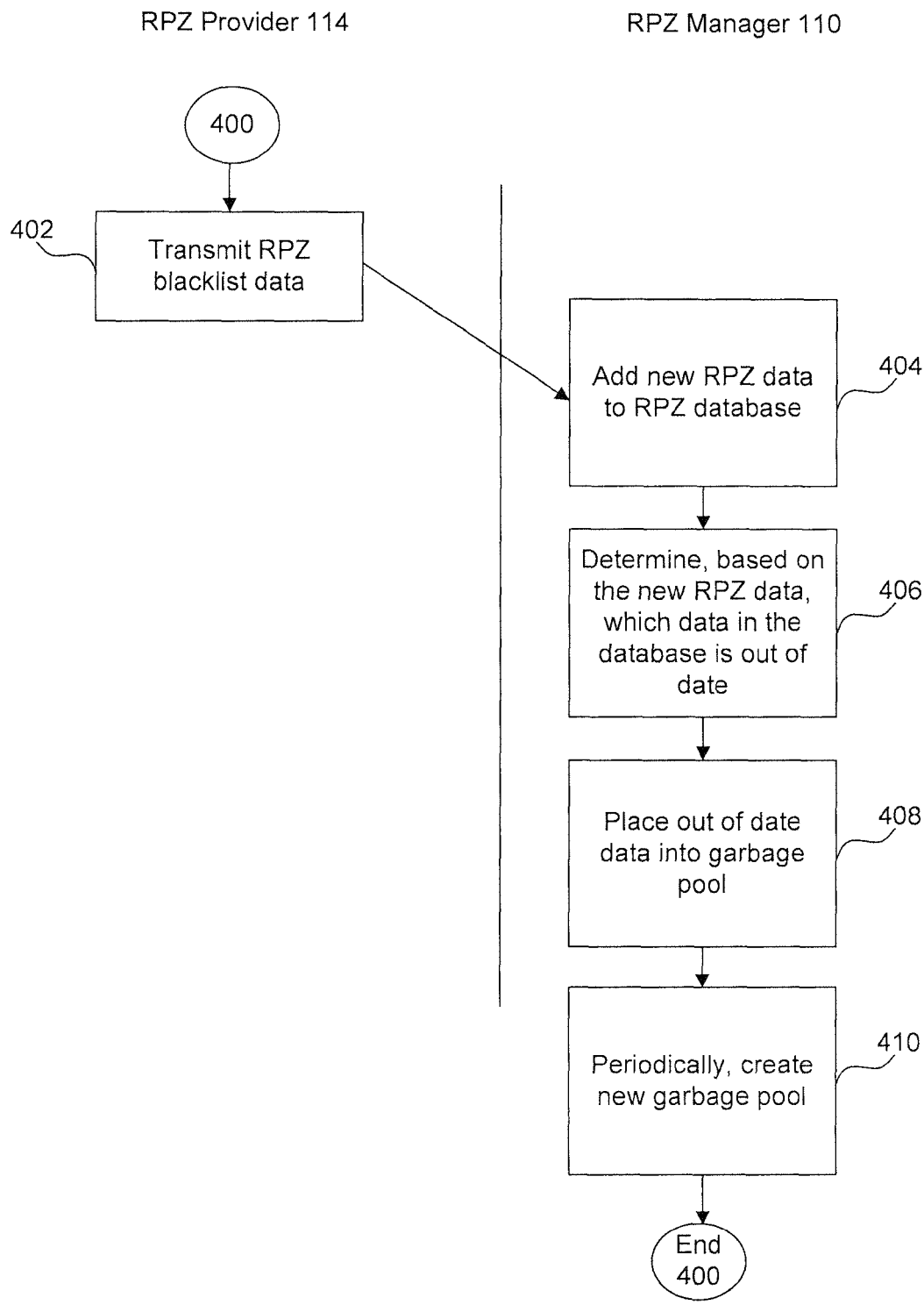
FIG. 4 illustrates a method for updating a domain name system blacklist, which may be used in operation of the system in FIG. 1.

FIG. 4 illustrates a method 400 for updating a domain name system blacklist, which may be used in operation of system 100 in FIG. 1.

Method 400 begins at step 402 when RPZ provider 114 transmits RPZ blacklist data to RPZ manager 110. The RPZ blacklist data may, for example, include a list of suspect domain names. The suspect domain names may be newly registered domain names or be domain names otherwise suspected of supporting malicious activity. The blacklist data may include policy information associated with each domain. The policy information may specify, for example, an action for a DNS resolver to take when asked to resolve the associated domain. The action may be, for example, to block the request or to redirect the request, for example by returning an IP address of a website indicating that the domain is suspicious.

On receipt of the RPZ blacklist data, RPZ manager 110 may store the new RPZ data to RPZ database 108. If the received RPZ blacklist data indicates a new record for a new domain not previously stored in RPZ database 108, RPZ manager 110 may merely write the new data to RPZ database 108. If the received RPZ blacklist data indicates that a record should be updated (e.g., a domain is no longer suspect or a new policy is associated with a domain), RPZ manager 110 may not immediately overwrite or delete the outdated data. Instead, RPZ manager 110 may place the outdated data in a garbage pool as described in steps 406-410.

At step 406, RPZ manager 110 determines, based on the received RPZ blacklist data, which data in RPZ database 108 is out of date. The out-of-date data may, for example, be the policy data associated with the updated domain.

The RPZ manager 110 places the out-of-date data into a garbage pool at step 408. The garbage pool may have an associated version number. In particular, RPZ manager 110 may place the out-of-date data into a garbage pool having the most current version number. Placing the out-of-date data into a garbage pool may not mean relocating the data in memory. To place outdated data into garbage, RPZ manager 110 may designate the data at that memory location as being outdated, for example, in a data structure describing the garbage pools. In particular, RPZ manager 110 may designate the data at those locations as being associated with the garbage pool having the most current version number. An example of how RPZ manager 110 updates RPZ database 108 is illustrated in FIGS. 5 and 6.

Figure 5:
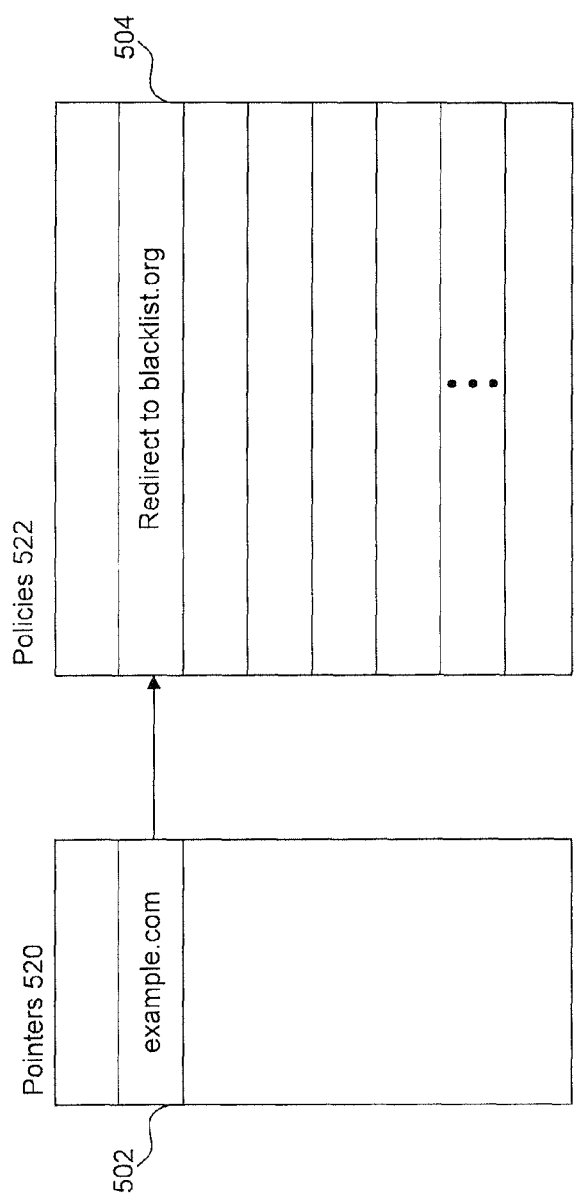
FIG. 5 is a diagram illustrating example contents of an RPZ database in the system in FIG. 1.

FIG. 5 is a diagram 500 illustrating an example of RPZ database 108's contents. RPZ database 108 includes pointers 520 and policies 522. In the example shown, the pointers 520 have domains associated with them, which are mapped to corresponding policies. For example, diagram 500 illustrates a pointer 502 associated with the domain "example.com", which is mapped to a policy 504, which indicates for DNS resolvers to redirect requests to resolve "example.com" to "blacklist.org." In other examples, the domain information may be stored with associated policies 522 and pointers 520 and also may include other index or table information that enables search and retrieval of data from policies 522. Pointer 520 may include information to access the most up-to-date data from policies 522. When new, updated data is received, pointers 520 may be modified as illustrated in FIG. 6.

Figure 6:
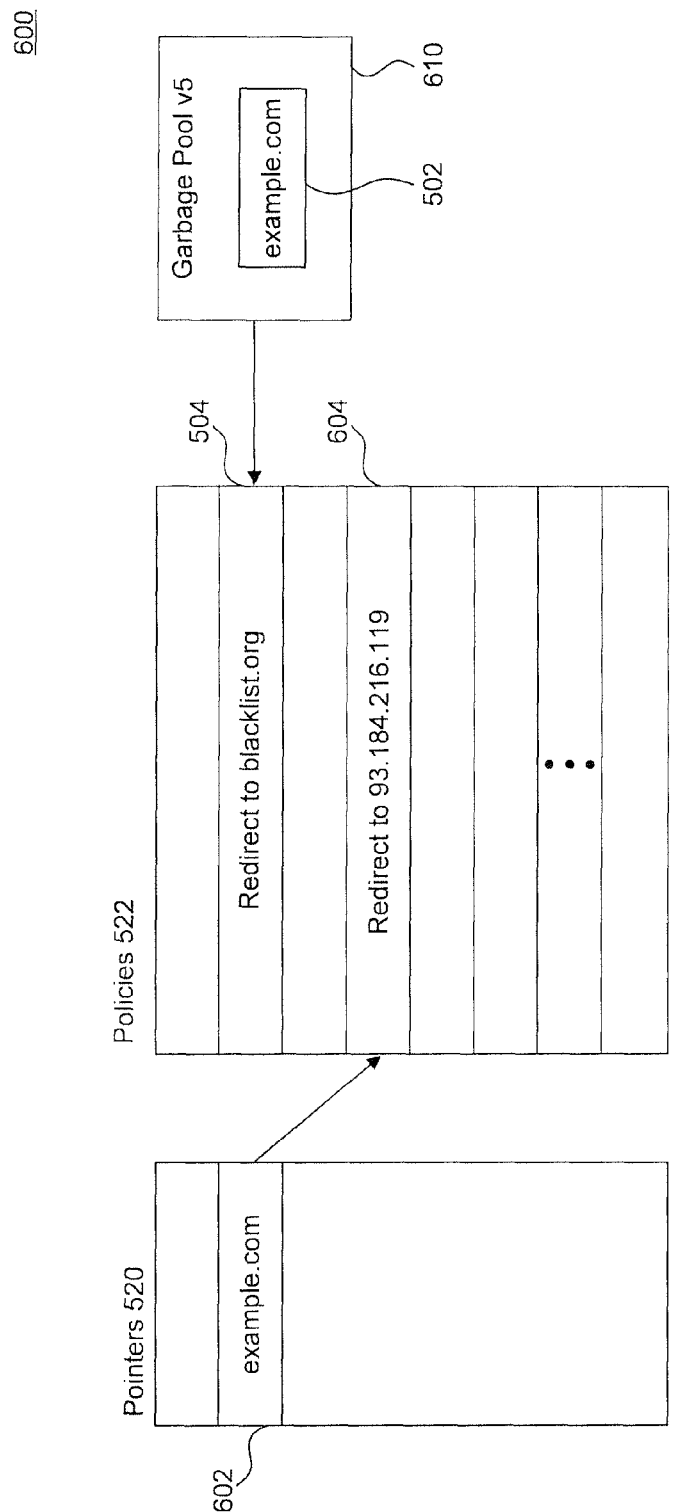
FIG. 6 is a diagram illustrating the example contents of an RPZ database after another update to the blacklist information.

FIG. 6 is a diagram 600 illustrating the example contents of an RPZ database after an update to the blacklist information. Like diagram 500, diagram 600 includes pointers 520 and policies 522. In the example, an updated policy is received for the domain "example.com." That updated policy is added to RPZ database as a new record, illustrated as a pointer 602, which maps to a policy 604. Policy 604 directs DNS resolvers to redirect requests to resolve "example.com" to "93.184.216.119." The outdated policy for example.com is placed into a garbage pool 610. Garbage pool 610 may be associated with the current version number, in this example version 5.

Referring back to FIG. 4, periodically, RPZ manager 110 may create a new garbage pool at step 410. To create a new garage pool, RPZ manager 110 may update the version number, for example by incrementing it. In the example above, after incrementing the version number, the version number would be six and any further updates would be placed in another garbage pool (not shown) with that updated version number.

In this way, by not immediately deleting or overwriting data in the RPZ database, RPZ manager 110 may avoid the need to obtain a lock on the RPZ database, or at least much of the data in the RPZ database. In other words, in the example in FIG. 6, a DNS resolver reading pointer 502 or policy 504 may continue to read that information while RPZ manager 110 is writing pointer 602 and policy 604. Pointer 502 and policy 504 may be deleted only when reads are complete. Reading and deleting information from the RPZ database is described with respect to FIGS. 7-10.

Querying and Deleting RPZ Data

Figure 7:
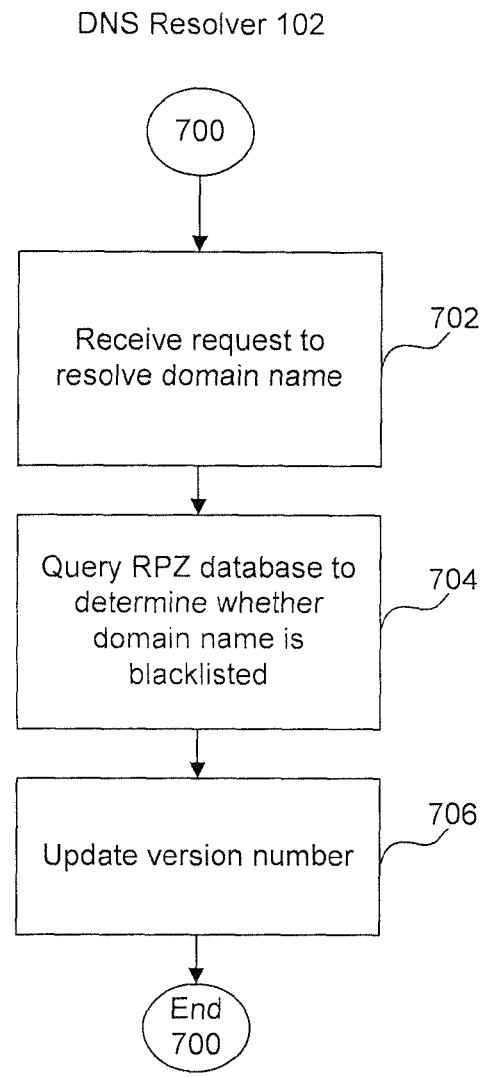
FIG. 7 illustrates a method for querying a domain name system blacklist, which may be used in operation of the system in FIG. 1.

FIG. 7 illustrates a method 700 for querying a domain name system blacklist, which may be used in operation of system 100 in FIG. 1.

Method 700 begins at step 702 when DNS resolver 102 receives a request to resolve a domain name. The request may be sent by another host computer on the network. To the host computer, DNS resolver 102 may act as a server, receiving the request with a domain name, after conducting necessary processing (e.g., checking the domain in the RPZ database and perhaps conducting recursive queries on DNS servers), returning the domain name's corresponding network address.

After receiving the request at step 702, DNS resolver 102 queries the RPZ database to determine whether the requested domain is blacklisted at step 704. For example, DNS resolver 102 may query the RPZ database to determine if RPZ database has a policy corresponding to the domain name. If the RPZ database does have a corresponding policy, DNS resolver 102 may determine whether the policy indicates that the domain name request should be blocked or redirected.

When DNS resolver 102 has completed reading the RPZ database at step 704, DNS resolver 102 updates its associated version number. In an embodiment, DNS resolver 102 may update its entry in a version array that it shares with an RPZ manager. DNS resolver 102 may set its version number to the most current version number, indicating to the RPZ manager that it has completed reads of prior versions. The RPZ manager may use the data in the shared version table to determine which garbage pools can be deleted, as illustrated in FIG. 8.

Figure 8:
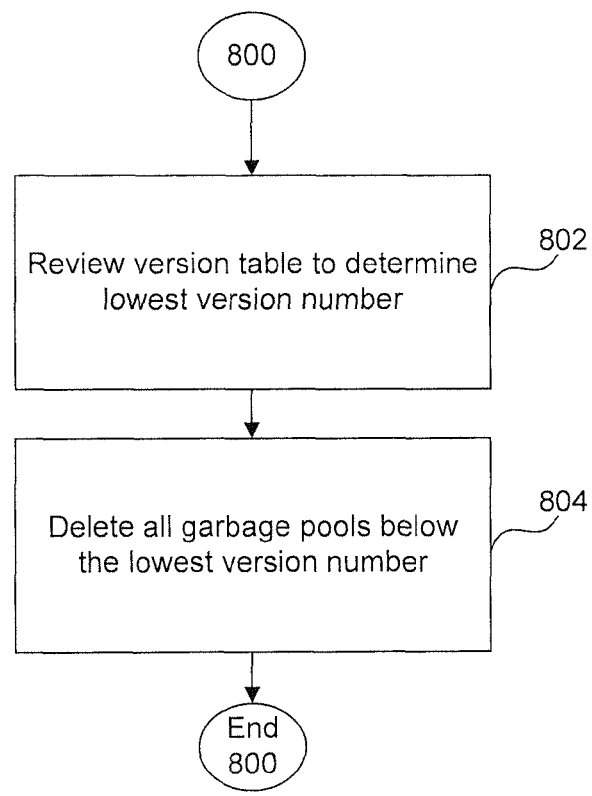
FIG. 8 illustrates a method for deleting old blacklist information, which may be used in operation of the system in FIG. 1.

FIG. 8 illustrates a method 800 for deleting old blacklist information, which may be used in operation of system 100 in FIG. 1. Method 800 may, for example, occur periodically.

Method 800 begins at step 802 with RPZ manager 110 reviewing the shared version table to determine the oldest version number. In an example, the oldest version number may be the lowest version number sequentially. This number, RPZ manager 110 determines, indicates the oldest data currently being read.

Figure 9:
FIG. 9 is a diagram illustrating another example version table.

FIG. 9 is a diagram 900 illustrating example version table 300 after a query of the RPZ database is complete. As described above for FIG. 3, the version number corresponding to DNS resolver 102 may be stored in slot number 1. After DNS resolver 102 completes a query, the version number in slot 1 is set to the current version number, in this case seven. Looking at the other entries in version table 300, RPZ manager 110 may determine at step 802 that the lowest version number is six and delete older garbage pools as illustrated in FIG. 10.

Figure 10:
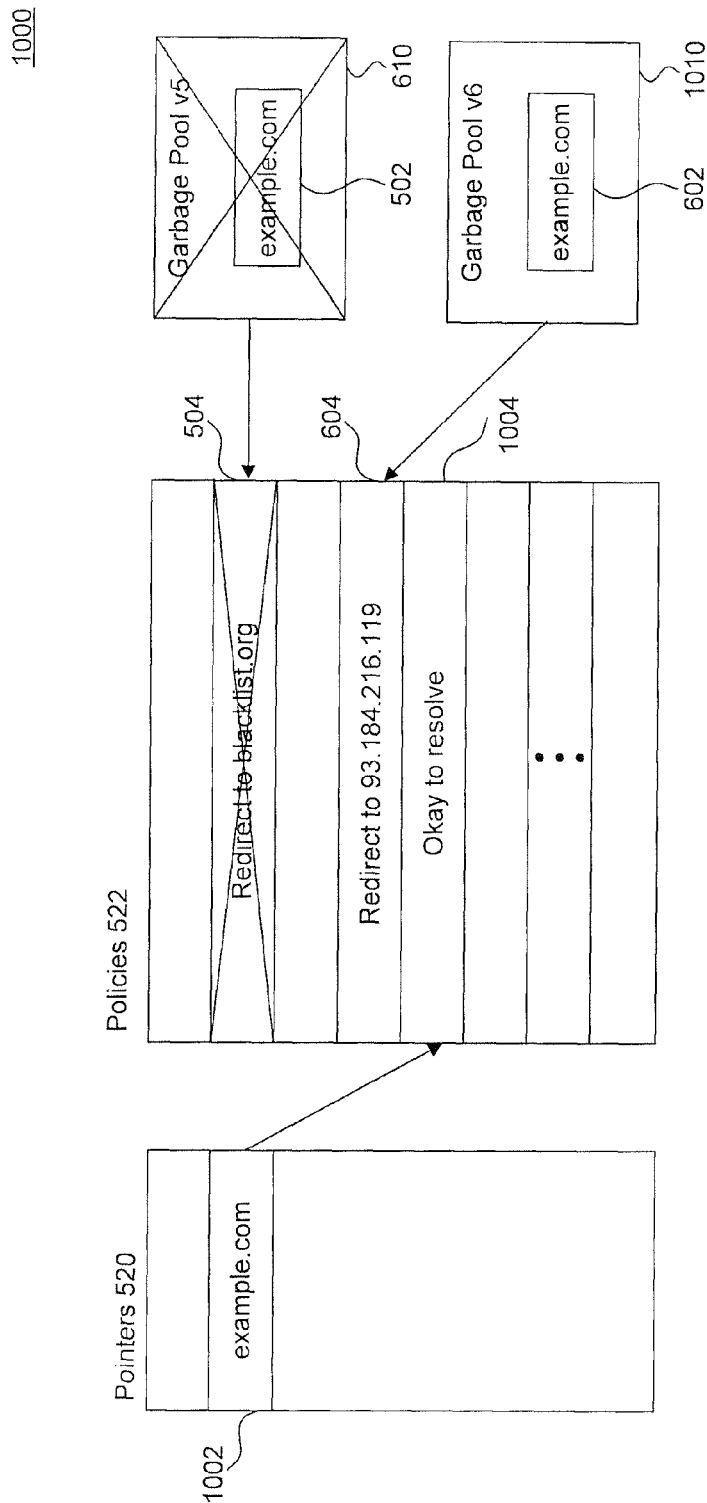
FIG. 10 is a diagram illustrating the example contents of an RPZ database after another update to the blacklist information.

FIG. 10 is a diagram 1000 illustrating the example contents of an RPZ database. Since diagram 600, the RPZ database has again been updated to include updated RPZ information for the domain "example.com." The updated RPZ information is illustrated as a pointer 1002 and a policy 1004. Policy 1004 may indicate that example.com is no longer suspect and is okay to resolve. The prior version of the domain's policy information—pointer 602 mapping to policy 604—has been placed in garbage pool 1010. Garbage pool 1010 has a corresponding version number 6.

Continuing the example from FIG. 9, once RPZ manager 110 determines that the earliest version number in the shared version table is six, RPZ manager 110 may delete garage pools having earlier version numbers. In FIG. 10, garbage pool 610 has a corresponding version 5, earlier than the oldest set of data currently being worked on. So, RPZ manager 110 may delete garbage pool 610 and all data it contains, including pointer 502 and policy 504. The deletion may, for example, involve de-allocating the memory locations of garbage pool 610, pointer 502, and policy 504.

In this way, RPZ manager 110 may only delete the garbage pools or versions that no DNS resolver is currently reading.

Typically, DNS resolvers may not be more than a few versions out of date. But, on occasion a DNS resolver may get stuck with its version number not advancing. The reason for getting stuck may vary. For example, an error may cause the issue. But, when a DNS resolver gets stuck, it may cause an RPZ manager 110 to keep older data around, when no longer required by any other resolver.

To deal with this issue, RPZ manager 110 may periodically determine whether an age of the earliest version number of all the DNS resolvers in the plurality of DNS resolvers exceeds a threshold. For example, RPZ manager 110 may determine whether the most outdated DNS resolver has a version that is a certain number if iterations behind the most up-to-date version or the next most outdated DNS resolver. When the age of the earliest version number is determined to exceed the threshold, RPZ manager 110 may take a snapshot of the data currently being used for that resolver. To take the snapshot, it may copy the garbage pool having the earliest version number and delete the original. Then, RPZ manager 110 may signal the lagging DNS resolver to cancel its current read and read from the copied version.

System Components

Figure 11:
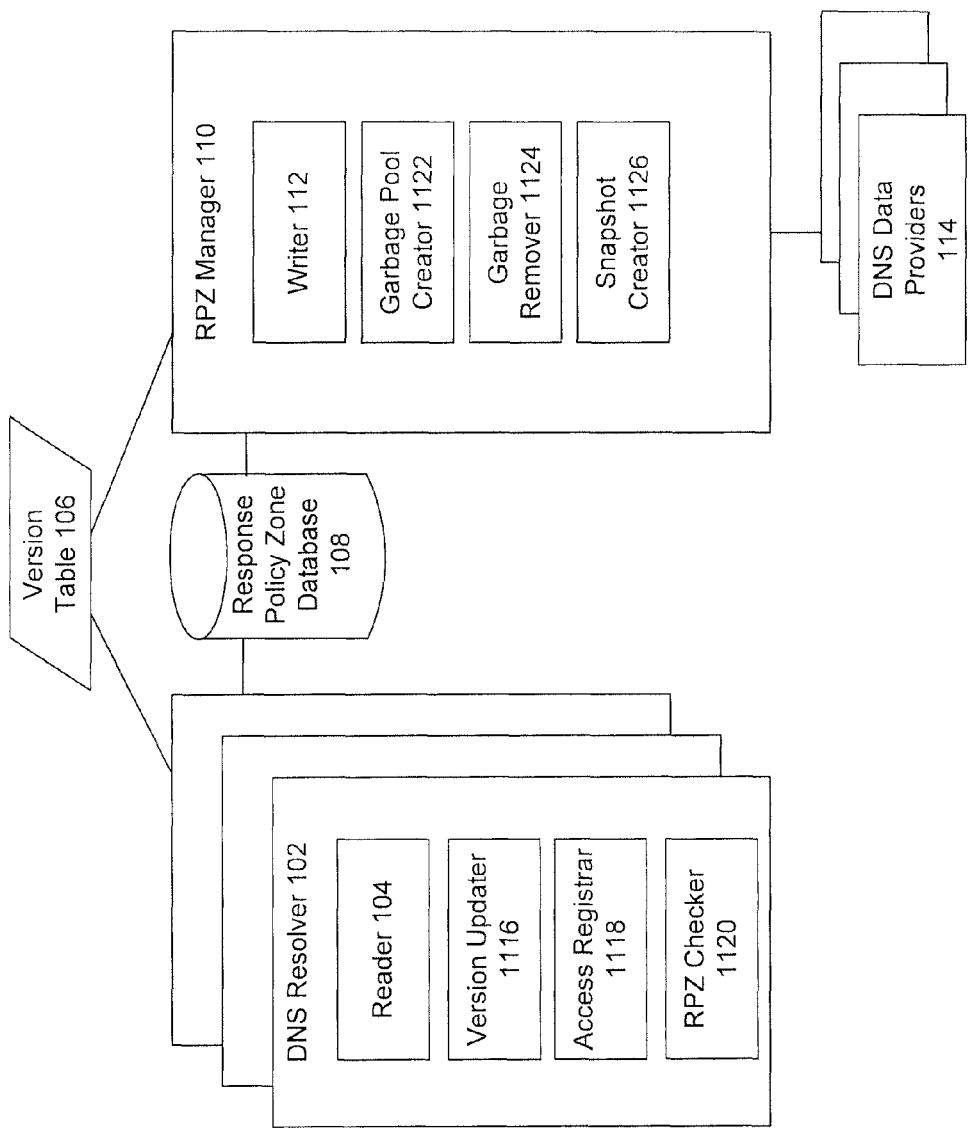
FIG. 11 is a diagram illustrating the system in FIG. 1 in greater detail.

FIG. 11 is a diagram illustrating system 100 in greater detail. As described above for FIG. 1, system 100 includes a plurality of DNS resolvers 102, version table 106, response policy zone 108, RPZ manager 110, and DNS data providers 114. Also described above for FIG. 1, each DNS resolver 102 includes reader 104, and RPZ manager 110 includes writer 112. In addition, each DNS resolver 102 includes a version updater 1116, an access registrar 1118, and an RPZ checker 1120, and RPZ manager 110 includes a garbage pool creator 1122, a garbage remover 1124, and a snapshot creator 1126. Each of these components as described in turn.

Version table 106 is stored on a memory accessible by each of the DNS resolvers 102 in the RPZ manager 110. It may, for example, be implemented as a shared memory mmap. RPZ database 108 is also coupled to and shared by each of the plurality of DNS resolvers 102. RPZ database 108 may store a domain name blacklist.

Each DNS resolver 102 may, for example, the implemented as a single, independent thread of execution. Each DNS resolver 102 may include an access registrar 1118 that, before reader 104 reads the entry: (i) sends a request to a writer to receive domain name blacklist data, and (ii) receives, as a response to the request, an index to a location in version table 106 where a version number assigned to the DNS resolver is stored.

As mentioned above, each DNS resolver 102 also includes a reader 104. Reader 104 is configured to read an entry of the domain name blacklist from RPZ database 108. The entry may specify a policy for the DNS resolver 102 to execute when the DNS resolver receives a request to resolve a domain name.

Reader 104 is coupled to version updater 1116. When the reading is complete, reader 104 may signal version updater 1116, and, in response, version updater 1116 may assign the current, most up-to-date version number to the DNS resolver 102. To assign the version number, version updater 1116 may write the most up-to-date version number to DNS resolver 102's indexed location in version table 106.

Once the reader 104 retrieves policy data from response policy zone database 108, RPZ checker 1120 may determine whether to execute domain name into the network address based on the entry the reader read. Also, RPZ checker 1120 may receive, at DNS resolver 102, a request to resolve the domain name into a network address and may signal reader 104 to read from RPZ database 108 in response to that request.

Turning to RPZ manager 110, RPZ manager 110 may be implemented as a single thread or as multiple threads. RPZ manager 110 thread(s) may be independent thread of execution from the plurality of DNS resolvers 102.

As mentioned above, RPZ manager 110 includes a writer 112 that can operate concurrently with DNS resolver 102's reader 104. Writer 112 configured to, before a reading operation from reader 104 is complete: (i) receive an updated entry of the domain name blacklist, (ii) add a new record to the domain name blacklist, and (iii) place the entry being read into a garbage pool having a current version number.

To create new garbage pools. RPZ manager 110 uses garbage pool creator 1122. Garbage pool creator 1122 may operate independently from reader 104, and perhaps independently from writer 112, in a separate thread of execution. It may, for example, operate periodically. To create a new garbage pool, garbage pool creator 1122 may be configured to: (i) increment the current version number, and (ii) create a new garbage pool for the incremented version number.

To remove old garbage pools, RPZ manager 110 uses garbage remover 1124. Similar to garbage pool creator 1122, garbage remover 1124 may operate independently from reader 104, and perhaps independently from writer 112, in a separate thread of execution. It may, for example, operate periodically. To remove old garbage pools, garbage remover 1124 may (i) determine the earliest version number of all the DNS resolvers in the plurality of DNS resolvers, and (ii) delete entries placed into garbage pools having version numbers earlier than the earliest version number the garbage remover determined in (i).

Finally, RPZ manager 110 uses snapshot creator 1126 to create snapshots for DNS resolvers 102 that appear stuck. In particular, snapshot creator 1126 may be configured to determine whether the age of the earliest version number of all the DNS resolvers in the plurality of DNS resolvers exceeds a threshold. When snapshot creator 1126 determines the age of the earliest version number to exceed the threshold, snapshot creator 1126 may copy the garbage pool having the earliest version number for the DNS resolvers and delete the garbage pool. Snapshot creator 1126 may then signal the stuck DNS resolver 102 to read from the copied version.

CONCLUSION

RPZ database 108 and version table 106 may be any stored type of structured memory, including a persistent memory. In examples, this database may be implemented as a relational database or file system.

Each of the processors and modules in FIGS. 1 and 11, including a plurality of DNS resolvers 102, RPZ manager 110, DNS data providers 114, reader 104, writer 112, version updater 1116, access registrar 1118, RPZ checker 1120, garbage pool creator 1122, garbage remover 1124, and snapshot creator 1126, may be implemented in hardware, software, firmware, or any combination thereof.

Each of the processors and modules in FIGS. 1, 2 and 3 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for lock-free updates to a domain name system blacklist, comprising:
   (a) reading, at a DNS resolver in a plurality of DNS resolvers, an entry of the domain name blacklist, the entry specifying a policy for the DNS resolver to execute when the DNS resolver receives a request to resolve a domain name;
   before the reading is complete:
   (b) receiving an updated entry of the domain name blacklist;
   (c) adding a new record to the domain name blacklist;
   (d) placing the entry being read into a garbage pool having a current version number;
   independently from the reading (a):
   (e) incrementing the current version number;
   (f) creating a new garbage pool for the incremented version number; and
   (g) when the reading is complete, assigning the current version number to the DNS resolver.

2. The method of claim 1, further comprising, periodically:
   (h) determining the earliest version number of all the DNS resolvers in the plurality of DNS resolvers; and
   (i) deleting entries placed into garbage pools having version numbers earlier than the earliest version number determined in (h).

3. The method of claim 2, further comprising:
   (j) receiving, at the DNS resolver, a request to resolve the domain name into a network address, wherein the reading (a) occurs in response to receipt of the request; and
   (k) determining whether to execute domain name into the network address based on the entry read in (a).

4. The method of claim 2, further comprising, before the reading (a):
   (j) sending, from the DNS resolver, a request to a writer to receive domain name blacklist data; and
   (k) receiving, as a response to the request, an index to a location where a version number assigned to the DNS resolver is stored.

5. The method of claim 4, wherein the writer assigns the current version number to the indexed location.

6. The method of claim 2, further comprising, periodically:
- (j) determining whether an age of the earliest version number of all the DNS resolvers in the plurality of DNS resolvers exceeds a threshold;
- when the age of the earliest version number is determined to exceed the threshold:
- (k) copying the garbage pool having the earliest version number for the DNS resolvers; and
- (l) deleting the garbage pool.

7. The method of claim 1, wherein steps (e) and (f) occur periodically.

8. A system for lock-free updates to a domain name system blacklist, comprising:
- a computing device including a processor and memory;
- a version table stored on the memory;
- a plurality of DNS resolvers that share the domain name system blacklist, each DNS resolver implemented on a computing device and including a reader configured to read an entry of the domain name blacklist, the entry specifying a policy for the DNS resolver to execute when the DNS resolver receives a request to resolve a domain name;
- a writer configured to, before the reading is complete: (i) receive an updated entry of the domain name blacklist, (ii) add a new record to the domain name blacklist, and (iii) place the entry being read into a garbage pool having a current version number;
- a garbage pool creator configured to, independently from the reader: (i) increment the current version number and (ii) create a new garbage pool for the incremented version number; and
- a version updater configured to, when the reading is complete, assign the current version number to the DNS resolver.

9. The system of claim 8, further comprising a garbage remover configured to periodically: (i) determine the earliest version number of all the DNS resolvers in the plurality of DNS resolvers; and (ii) delete entries placed into garbage pools having version numbers earlier than the earliest version number the garbage remover determined in (i).

10. The system of claim 9, further comprising an RPZ checker configured to (i) receive, at the DNS resolver, a request to resolve the domain name into a network address, wherein the reader reads the entry in response to receipt of the request, and (ii) determine whether to execute domain name into the network address based on the entry the reader read.

11. The system of claim 9, further comprising, an access registrar that, before the reader reads the entry: (i) send, from the DNS resolver, a request to a writer to receive domain name blacklist data, and (ii) receive, as a response to the request, an index to a location where a version number assigned to the DNS resolver is stored.

12. The system of claim 11, wherein the writer assigns the current version number to the indexed location.

13. The system of claim 9, further comprising a snapshot creator configured to, periodically: determine whether an age of the earliest version number of all the DNS resolvers in the plurality of DNS resolvers exceeds a threshold, and, when the age of the earliest version number is determined to exceed the threshold copy the garbage pool having the earliest version number for the DNS resolvers and delete the garbage pool.

14. The system of claim 8, wherein the garbage pool creator operates periodically.

15. A non-transitory computer-readable medium having instructions stored thereon that, when executed by at least one computing device, causes the at least one computing device to perform a method for lock-free updates to a domain name system blacklist, the method comprising:
- (a) reading, at a DNS resolver in a plurality of DNS resolvers, an entry of the domain name blacklist, the entry specifying a policy for the DNS resolver to execute when the DNS resolver receives a request to resolve a domain name;
- before the reading is complete:
- (b) receiving an updated entry of the domain name blacklist;
- (c) adding a new record to the domain name blacklist;
- (d) placing the entry being read into a garbage pool having a current version number;
- independently from the reading (a):
- (e) incrementing the current version number;
- (f) creating a new garbage pool for the incremented version number;
- (g) when the reading is complete, assigning the current version number to the DNS resolver.

16. The computer-readable medium of claim 15, the method further comprising, periodically:
- (h) determining the earliest version number of all the DNS resolvers in the plurality of DNS resolvers; and
- (i) deleting entries placed into garbage pools having version numbers earlier than the earliest version number determined in (h).

17. The computer-readable medium of claim 16, the method further comprising:
- (j) receiving, at the DNS resolver, a request to resolve the domain name into a network address, wherein the reading (a) occurs in response to receipt of the request; and
- (k) determining whether to execute domain name into the network address based on the entry read in (a).

18. The computer-readable medium of claim 16, the method further comprising, before the reading (a):
- (j) sending, from the DNS resolver, a request to a writer to receive domain name blacklist data; and
- (k) receiving, as a response to the request, an index to a location where a version number assigned to the DNS resolver is stored.

19. The computer-readable medium of claim 18, wherein the writer assigns the current version number to the indexed location.

20. The computer-readable medium of claim 16, the method further comprising, periodically:
- (j) determining whether an age of the earliest version number of all the DNS resolvers in the plurality of DNS resolvers exceeds a threshold;
- when the age of the earliest version number is determined to exceed the threshold:
- (k) copying the garbage pool having the earliest version number for the DNS resolvers; and
- (l) deleting the garbage pool.

21. A computer-implemented method for lock-free updates to a shared memory, comprising:
- (a) reading, at a reader thread in a plurality of reader threads, an entry of the shared memory;
- before the reading is complete:
- (b) receiving an updated entry of the shared memory;
- (c) adding a new record to the shared memory;
- (d) placing the entry being read into a garbage pool having a current version number;
- independently from the reading (a):
- (e) incrementing the current version number;
- (f) creating a new garbage pool for the incremented version number;

(g) when the reading is complete, assigning the current version number to the reader threads;

periodically:

(h) determining the earliest version number of all the reader threads in the plurality of reader threads; and (i) deleting entries placed into garbage pools having version numbers earlier than the earliest version number determined in (h).

\* \* \* \* \*